Jan. 14, 1936.  R. LAPSLEY  2,027,442
TRANSMISSION
Filed May 29, 1933  3 Sheets-Sheet 1

Inventor
Robert Lapsley
By Mason, Jackson, Bottner & Brunner
Attys.

Jan. 14, 1936.  R. LAPSLEY  2,027,442
TRANSMISSION
Filed May 29, 1933   3 Sheets-Sheet 2
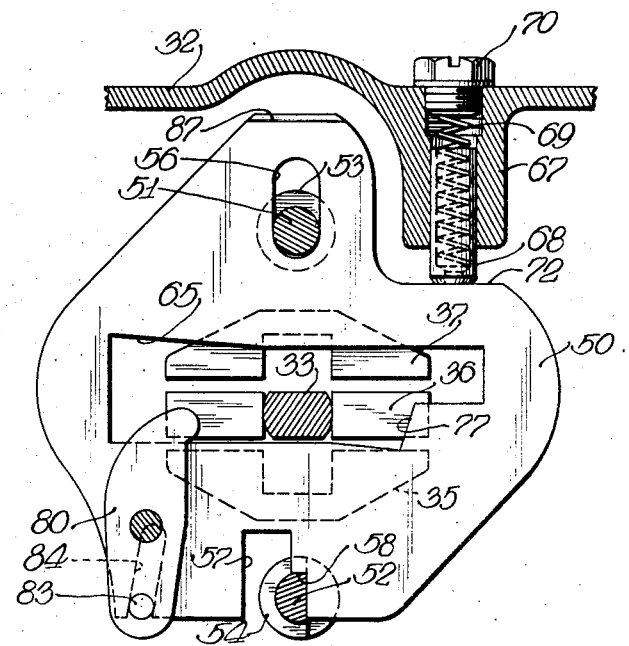
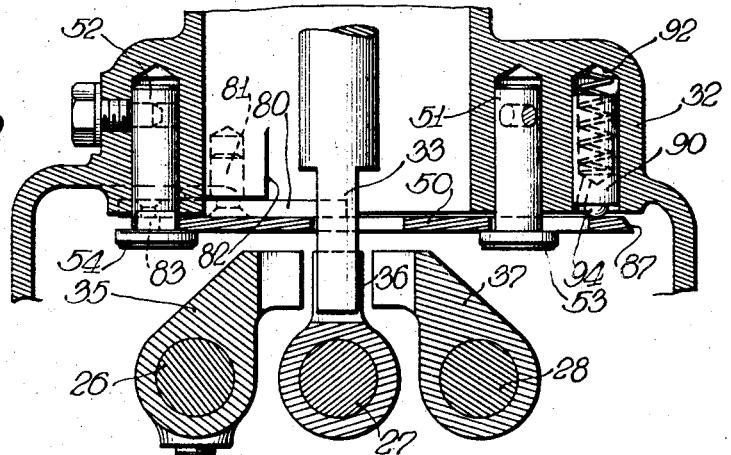
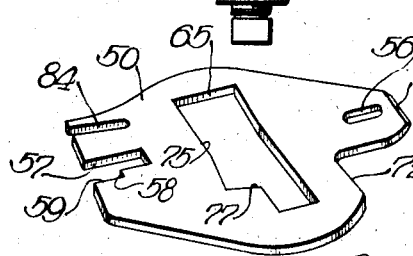
Inventor
Robert Lapsley

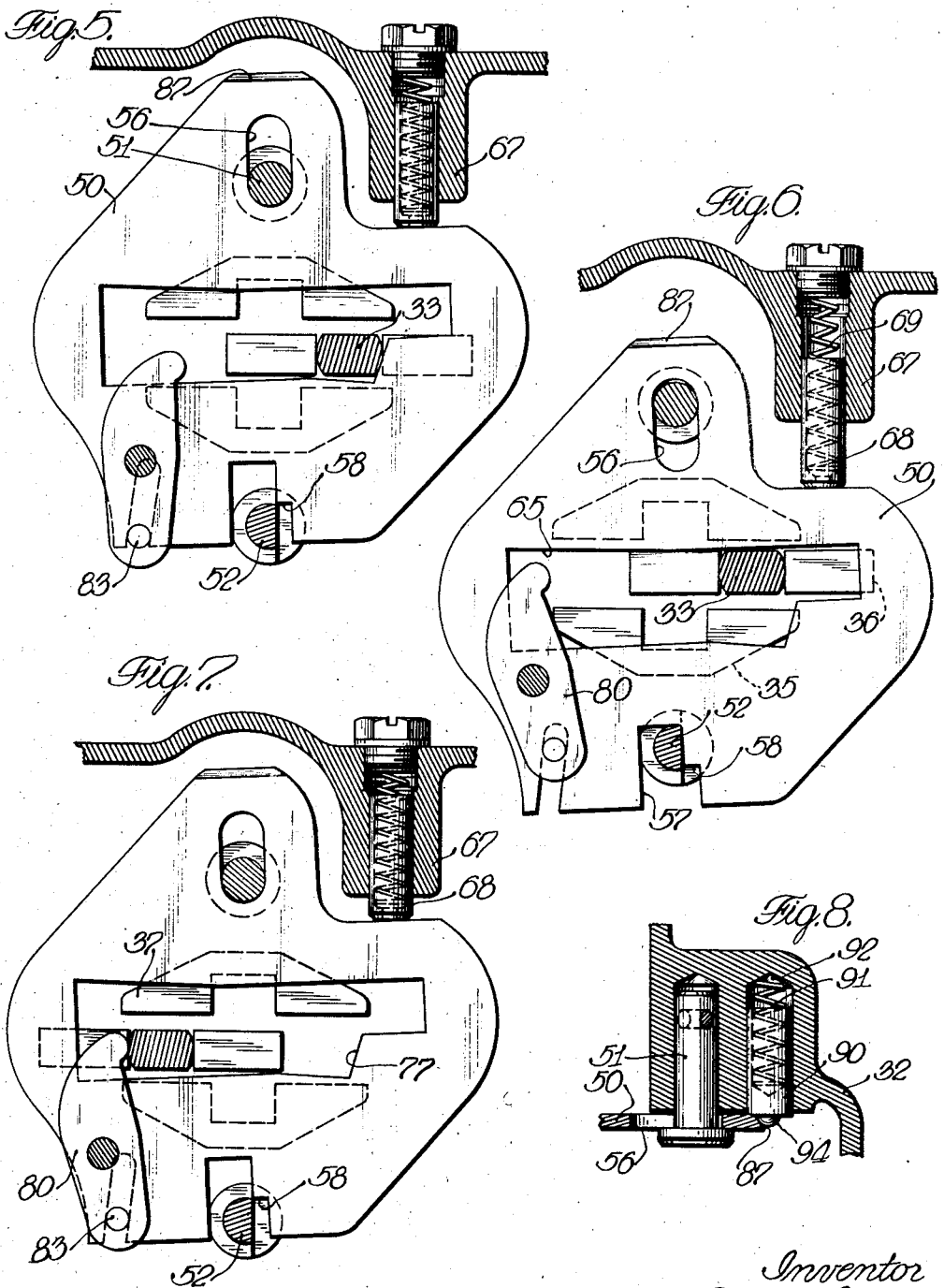

Patented Jan. 14, 1936

2,027,442

UNITED STATES PATENT OFFICE 2,027,442

TRANSMISSION

Robert Lapsley, Berrien Springs, Mich., assignor to Clark Equipment Company, Buchanan, Mich., a corporation of Michigan Application May 29, 1933, Serial No. 673,377

13 Claims. (Cl. 74—475)

The present invention relates generally to power transmission devices, and particularly to transmissions adapted for use in automotive vehicles and the like.

Transmissions for automobiles and other vehicles are provided so as to secure a plurality of different driving ratios between the motor and the driving wheels for the purpose of accommodating various driving conditions and for accelerating the vehicle. In some cases transmissions are employed in which four or more speeds forward and reverse are obtainable, and where more than four forward speeds are provided, the lowest stage or ratio and the reverse drive are generally arranged to be controlled by the same shift rod. The lowest stage or ratio is not intended, generally, to be employed for acceleration, or even started unless the load is exceptionally heavy, in normal driving but is an emergency low gear for heavy duty. Thus, the maximum speed reduction ratio and the reverse drive are seldom employed as compared with the other gear ratios.

In normal operation, the vehicle or other apparatus is started and gotten underway by progressively selecting different gear ratios varying from what is termed low gear or low driving ratios to high gear or high driving ratios. These ratios are selected, according to best engineering practice, in accordance with the normal load, the characteristics of the motor, and the acceleration or torque desired.

Now in passing from one gear ratio to another, it is not desirable to shift from one of the low gear ratios to a high gear ratio without engaging at least one of the more intermediate ratios, although it is possible where a number of ratios may be selected to omit one or more of the ratios during the progression.

With the above factors in mind, the present invention contemplates the provision of means arranged to prevent the operator from accidentally or carelessly selecting improper gear ratios. More particularly, the present invention contemplates means providing a restraint upon the unlimited selection of ratios possible in the conventional transmission. For example, the present invention contemplates means serving to prevent the operator from engaging either the emergency low gear or the reverse gear accidentally or carelessly unless such ratio or ratios are actually desired and an effort is expended to secure the same. Likewise, the present invention also contemplates the provision of means serving to prevent the operator from selecting one of the higher gear ratios unless one of the more intermediate gear ratios has been employed in the sequence. Specifically, the present invention provides means to positively prevent the gear shift member from being moved from either low or reverse directly to fourth or fifth speeds. According to the principles of the present invention, it is necessary for the operator to select one of the intermediate ratios, and the selecting of this ratio serves to release or disengage the means which operated to prevent the selection of fourth or fifth speeds directly from the lower ratios.

Another object of the invention is the provision of means to prevent the engagement of the gears in an improper sequence of ratios but which means automatically yields to any reasonable progression of shifts and is of simplified construction in that the operator is not required to manually release a latch in order to engage any speed in the transmission.

The present invention also contemplates the utilization of a latch plate operatively associated with the gear shift lever or equivalent member and serving to restrain the unlimited movement thereof to such an extent that at any one time only certain of the possible driving ratios available may be selected, but in such connection the present invention also contemplates the means for shifting the latch plate so as to make possible the selection of driving ratios not included in the first group, the shifting of the latch plate being controlled by the act of selecting one of the higher driving ratios of the first group. Further, the present invention also contemplates means for preventing the return of the latch plate to its original position, thereby preventing the engagement of the lower driving ratios or reverse unless the same are actually desired and an extra effort is made to secure the same.

Still further, the present invention contemplates the provision of a transmission in which the various driving gear ratios available are arranged in several groups, certain of which provide for high driving ratios and others of which provide for low driving ratios, with intermediate group or groups, in connection with which arrangement the present invention further contemplates the provision of a latch plate or a selector serving to limit the selections possible to either the lower ratios and the intermediate ratios or the intermediate ratios and the higher ratios. That is, the intermediate group or groups may be freely selected at any time, but the end groups, that is to say, the higher or the lower driving ratios, are not both capable of being freely selected unless certain acts are performed to that end. Generically, of course, the intermediate ratios may be considered with either of the end groups, so that there is one group of lower driving ratios and a second group of higher driving ratios, with means controlling the selection of positions therein.

These and other objects of the present invention will be apparent to those skilled in the art after a consideration of the following detailed description of the construction in which the principles of the present invention are preferably embodied, such construction being shown by way of example in the accompanying drawings forming a part of this specification.

In the drawings:

Figure 2 is a section taken along the line 2—2 of Figure 1 but on an enlarged scale, showing in particular my novel latch plate construction and the relation between the same and the lower end of the gear shift lever;

Figure 3 is a section taken along the line 3—3 of Figure 1;

Figure 4 is a perspective view of the latch plate shown in Figures 1 to 3;

Figures 5, 6 and 7 are similar to Figure 2 and show different positions of the latch plate; and Figure 8 is a fragmentary section, similar to the section shown in Figure 3, showing the restraining means in operative position to resist the return of the latch plate to the position which it occupies in Figure 2.

Figure 1:
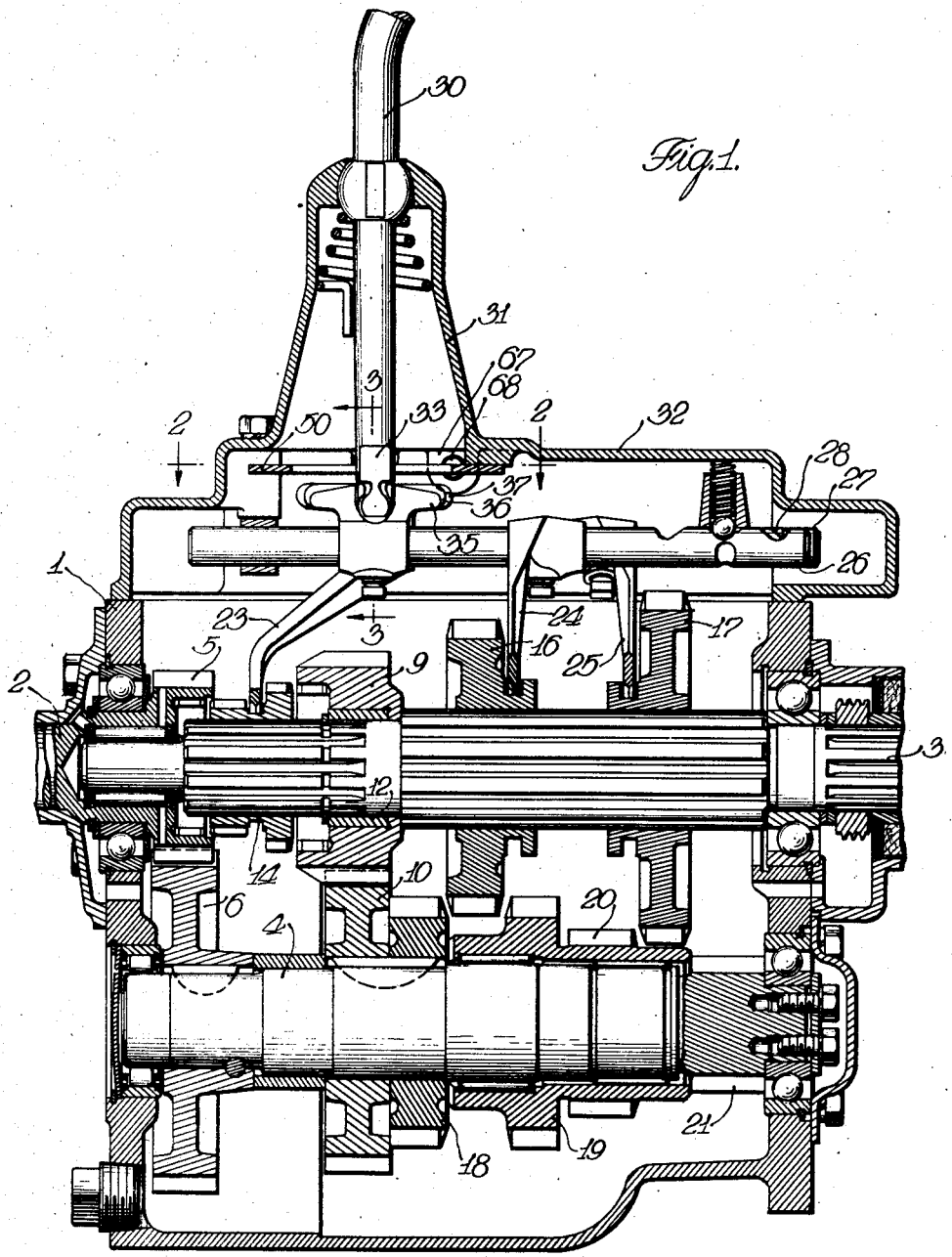
Figure 1 is a vertical longitudinal section taken through a transmission embodying the principles of the present invention.

Referring now more particularly to Figure 1, the transmission in which the present invention has been embodied is a transmission adapted for use in automotive vehicles and the like and, insofar as the present invention is concerned, may be of more or less conventional construction. As shown, however, the transmission embodies a casing 1 in which is journaled a driving shaft 2, a driven shaft 3 and a countershaft 4. The countershaft 4 is driven from the driving shaft 2 by means of a pair of gears 5 and 6, these gears being arranged to be in constant mesh. A second pair of constant mesh gears 9 and 10 serve to connect the driven shaft 3 with the countershaft 4. The gear 9 is journaled for rotation on the driven shaft 3 by bushing means 12 and is adapted to be connected with the driven shaft by means of as lidable clutch hub 14 which is adapted to be shifted to either connect the driven shaft 3 with the gear 5 on the driving shaft or with the gear 9. The driven shaft 3 carries other slidable gears 16 and 17, the former being adapted to engage either the gear 18 or the gear 19 while the slidable gear 17 is adapted to mesh with the gear 20 or a reverse gear (not shown). The gear 18 is connected directly with the countershaft 4 while the gears 19 and 20 are rotatable with respect to the countershaft gear at a reduced speed by suitable gear connections associated with a pinion 21, somewhat as suggested in the patent to A. G. Herreshoff, No. 1,474,033, issued November 13, 1923. The shiftable gear members 14, 16 and 17 are controlled, respectively, by shift forks 23, 24 and 25, the shift forks being carried, respectively, by shift rods 26, 27 and 28. The shift rods 26, 27 and 28 are controlled by means of a gear shift lever 30 which is supported for limited movement by a shift housing 31 carried by the cover plate 32 of the transmission casing 1 and having its lower end 33 arranged to engage shift yokes 35, 36 and 37 carried, respectively, by the shift forks 26, 27 and 28.

From the above description it will be observed that the transmission shown provides five speeds or driving ratios for forward travel and one driving ratio for reverse. In operating the vehicle or other machine having such a transmission, it is frequently unnecessary to engage the lowest driving ratio, that is, the ratio providing the greatest reduction, unless the machine is to be started under adverse conditions, such as in abnormally heavy load or unfavorable road conditions or other factors. Likewise, in accelerating the machine, it is not necessary to engage every one of the driving ratios possible in progressively increasing the speed of the machine. For example, it is frequently possible to start in what is commonly termed second gear and to engage only one of the intermediate gears, namely third or fourth, before selecting fifth speed, commonly called high gear or direct drive. However, for best operation it is not desirable to go directly from first speed to one of the higher speeds, as fourth or fifth gear, without engaging at least one of the intermediate speeds. The different driving ratios available in the conventional transmission may therefore be grouped into three or more groups, one group consisting of, as in the present embodiment, emergency low gear and reverse, the second group consisting of second and third speeds, and the third group consisting of fourth and fifth speeds. The first and third groups may be considered as the end groups in that they are, respectively, the driving ratios providing the slowest speeds and the highest speeds, while the second group may be considered an intermediate group.

Coming now to the feature of the present invention which prevents misuse of the transmission by preventing the engagement of gears in an improper sequence of ratios while automatically yielding to any reasonable progression of shifts, I have provided a latch plate 50 best shown per se in Figure 4 and which is suspended from the cover housing 32 by a pivot pin 51 and a stop pin 52 both having heads, 53 and 54, respectively, best shown in Figure 3. The latch plate 50 is provided with a slot 56 which receives the pivot pin 51 and provides for both sliding and pivotal movement of the latch plate 50 with respect thereto. A notch 57 is provided in the latch plate 50 opposite the slot 56, the notch 57 being provided with a shoulder 58 adjacent a recessed portion 59 for a purpose which will be described later. The notch 57 accommodates the stop pin 52.

A central slot 65 of the form best shown in Figure 4 is provided in the plate 50 and cooperates with the gear shift lever 30 by receiving the lower end 33 thereof. The slot 65 is of certain dimensions with respect to the spacing of the shifting yokes 35, 36 and 37, the relation between these parts being best shown in Figure 2, and is such that, with the latch plate 50 in a given position, the movements of the gear shift lever 30 are restricted so that the lower end 33 thereof may select only certain of the possible driving ratios.

Referring now more particularly to Figure 2, it will be seen that one wall of the cover plate 32 is provided with an apertured boss 67 which receives a spring pressed plunger 68, the spring means 69 thereof being capable of reacting against a screw 70 to urge the plunger 68 toward a shoulder 72 formed on the latch plate 50 adjacent but eccentric with respect to the axis of the pivot pin 51. The spring pressed plunger 68, therefore, imparts a bias to the plate 50 urging it in a given direction. The bias established by the spring pressed plunger 68 is opposed by the engagement of the shoulder 58 against the stop pin 52, the pivot pin 51 in this position being disposed at one end of the slot 56. In this position of the latch plate 50, the slot 65 is so disposed with respect to the shift yokes 35, 36 and 37 that the lower end 33 of the gear shift lever 30 is enabled to engage only the yokes 36 and 37, the edge 75 of the slot 65 effectively preventing the movement of the lower end 33 of the gear shift lever into engagement with the yoke 35 as long as the shoulder 58 abuts against the stop pin 52. In this position, therefore, the operator is enabled to select only the driving ratios controlled by the shift yokes 36 and 37, these driving ratios being in the present embodiment reverse, first, second and third speeds, or, in other words, only the driving ratios in the first and second groups above mentioned. For example, in this position, the operator may select either first or second gear to start the machine forwardly, but it would be impossible for the operator to shift directly from either of these gears into fourth or fifth speeds. The operator may, of course, engage reverse drive to start the machine rearwardly.

In order to permit the subsequent selection of either fourth or fifth speeds, or both, it is necessary to free the latch plate from the stop pin 52 and the means to this end will now be described. Adjacent one end of the slot 65 is a cam section or abutment shoulder 77 which is disposed in the path of movement of the gear shift lever when the lower end 33 thereof is moved to select second speed or second driving ratio. Likewise, adjacent the other end of the slot 65 is a pivoted lever 80 having a portion disposed in the path of movement of the lower end 33 of the gear shift lever when the latter is moved to select third speed or third driving ratio. The pivoted lever is supported, as best shown in Figure 3, from the cover housing 32 by means of a pin 81 carried by a boss 82 formed on the housing cover 32. The end of the lever 80 opposite the portion 81 is disposed adjacent the edge of the latch plate 50 and carries a pin 83 adapted to engage within a slot or notch 84 formed in the latch plate 50 adjacent the locking notch 57. Thus, whenever the lower end 33 of the gear shift lever engages the portion 81 of the pivoted lever to rock the same in a counterclockwise direction as viewed in Figure 2, the latch plate will be pivoted about its pivot pin 51 in a counterclockwise direction and will shift the shoulder 58 out of engagement with the stop pin 52, as best shown in Figure 7, the spring pressed plunger 68 being forced inwardly of its boss 67 by this operation. In a similar way, when the lower end 33 of the gear shift lever engages the shoulder 77 at the other end of the slot 65, the latch plate 50 will be pivoted about the pivot pin 51 to move the stop shoulder 58 away from the stop pin 52, as best shown in Figure 5.

Whenever either of these operations has been accomplished and the stop shoulder 58 freed from the stop pin 52, the tension of the spring 69 acting through the spring pressed plunger 68 becomes immediately effective to shift the latch plate 50 so that the pin 51 lies at the other end of the slot 56 and so that the stop pin 52 lies at the bottom of the notch 57. This position of the latch plate 50 is best shown in Figure 6, from which it will be observed that this shift of the latch plate 50 has now disposed the slot 65 in such a position that the shift yoke 35 may now be engaged by the end 33 of the gear shift lever so that either fourth or fifth speeds may be selected by the operator. Thus, after the operator has selected either second or third speeds the latch plate, which formerly positively prevented the selection of fourth or fifth speeds, now permits that selection.

From the above description it will be clear that I have provided means operative when the machine is being accelerated in the lower driving ratios to prevent the accidental or careless selection of a driving ratio out of the normal or desirable sequence or progression of shifts. The means that I have provided, however, are such that as long as any reasonable progression of shifts is employed the latch plate 50 operates automatically to permit such progression. Now having provided means permitting a reasonable sequence or progression of shifts from low or reverse to high gear, it becomes of substantially equal importance to prevent an operator from carelessly or accidentally shifting from one of the higher speeds to one of the lower speeds too far down in the sequence. In the present instance, such desirable result is conveniently accomplished by introducing a resistance to the return of the latch plate 50 from its position shown in Figure 6 to its position shown in Figures 2 and 5. To this end, the end of the latch plate 50 adjacent the slot 56 is provided with a bevel 87 adjacent which is disposed a spring pressed plunger 90 including a spring 91 received within a bore 92 formed in the cover housing 32 and provided with a ball end 94 adapted to engage the bevel end 87 of the latch plate 50. When the latter is arranged to permit the selection of the lower gear ratios, the spring pressed plunger is retracted in the bore 92 and the ball end 94 engages the upper surface of the latch plate. However, when the latch plate 50 has been shifted to the position shown in Figure 6, the ball end 94 of the spring pressed plunger 90 snaps behind the bevel end 87, as best shown in Figure 8, and is therefore disposed in a position to offer resistance to the return of the latch plate 50 to its original position shown in Figure 2. This resistance is established because it is necessary when shifting the latch plate 50 back to its original position to cam the spring pressed plunger 90 upwardly against the tension of the spring 91. As will be understood, the latch plate 50 will be moved back to its original position by the operator pressing the lower end 33 of the gear shift lever against the edge of the slot 65 opposite the lower edge 75. It is also to be noted that this return movement of the latch plate 50 is opposed by the spring 69.

From the above it will be observed that the latch plate 50 embraces the lower end of the gear shift lever and restricts the otherwise unlimited selection of driving ratios, permitting, however, an unlimited selection within certain limits. Thus, a simple and orderly progression of shifts are obtained which is flexible enough to meet all conditions but which is, nevertheless, capable of offering certain restrictions to thereby prevent misuse of the transmission and engagement of the gears in an improper sequence of ratios.

From the above detailed description, the operation of a transmission constructed according to the principles of the present invention is believed to be apparent. Reverse is obtained by moving the lever 33 toward the pivot pin 51, thereby disposing the latch plate 50 in the position shown in Figure 1 if it is not already in that position, and moving the shift yoke 37 to the right as viewed in Figure 2, which is to the rear of the transmission in normal installations. Upon returning to neutral, any of the three lower speeds may be selected. If, for example, the shift yoke 37 is moved forwardly, that is to the left as viewed in Figure 2, low speed, sometimes called emergency low speed, is selected, and upon returning the shift yoke 37 to neutral and moving the gear shift lever 33 sidewise into engagement with the shift yoke 36, the edge 75 of the slot 65 will prevent the lever 33 from continuing in such sidewise movement and will prevent its engagement with the shift yoke 35 instead of the shift yoke 36 as desired, in order to properly progress through second and third speeds into fourth and high. Since the latch plate 50 is positively retained in the position shown in Figure 2 by the abutment shoulder 58 engaging the stop pin 52, the high speed shift yoke 35 will not be accidentally engaged, no matter how sharply the gear shift lever 33 strikes the edge 75 of the latch plate 50.

From the operation so far described, it will be understood that the operator may shift into reverse and back up, after which he may start forward, using any of the three lower ratios, which are the only reasonable ratios he should use for starting in a forward direction. After any one or more of these three lower ratios has been selected, the operator may progress to high speed through an orderly sequence of ratios without stop or special operations in shifting, and without danger of engaging any ratio other than in its correct sequence. This result is secured by virtue of the above described construction wherein, whenever either second or third speed is selected, the latch plate 50 is automatically shifted into a position to permit the selection of either fourth or fifth speeds or both.

With the transmission engaged in high speed, and if it is desired to progress to lower ratios, the latch 50 still functions to prevent the engagement of ratios in an improper sequence. The shift lever 33 would first move the yoke 35 to the right as viewed in Figure 2 to engage fourth speed. Then the lever 33 would shift the yoke 35 to neutral and would then be moved sidewise into the intermediate shift yoke 36, striking the edge of the slot 65 opposite the lower edge 75. The spring pressed plunger 68 would then operate as a check to prevent the latch plate 50 from moving so that the slot 65 would then guide the gear shift lever 33 into proper engagement with the intermediate shift yoke 36 and would be effective in ensuring that either second or third speed would be next selected. Should it then be desired to select low speed, it is necessary to shift the intermediate yoke 36 to its neutral position and to pull sharply on the gear shift lever to press the lower end 33 thereof against the latch plate 50. The detent or spring pressed plunger 90 will then yield and allow the latch plate 50 to be shifted into the position shown in Figure 2, thus allowing either low speed or reverse to be selected.

While I have described above the preferred construction in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. In a selective transmission, a shiftable member optionally movable to a plurality of positions normally providing progressively varying driving ratios, means limiting the selection to any one of a group consisting of a limited number of less than all of said positions, and means actuated by the selection of certain of said limited number of positions for shifting said first means to provide for the selection of positions outside said group.

2. In a selective transmission, a shiftable member optionally movable to a plurality of positions normally providing progressively varying driving ratios, releasable means adapted to be locked in one position to prevent the movement of said member to a position of higher driving ratio until a position of lower driving ratio has been selected, means responsive to the selection of a position of lower driving ratio for releasing said releasable means, and means operative to restore said releasable means to its locked position upon subsequent movement of said shiftable member toward a position of lower driving ratio.

3. In a selective transmission, an optionally shiftable member movable to a plurality of positions to provide different driving ratios, shiftable latch means associated with said member and operative in one position to prevent the movement thereof to certain of said positions, and means connected with said latch means and engageable by said shift member to cause the latter when moved to one or more of said last named positions to move said latch means to provide for the selection of positions other than said last named positions.

4. In a selective transmission including a plurality of shift members an optionally shiftable member movable to a plurality of positions to select certain of said members to provide a first group of lower driving ratios and to a plurality of other positions to select other of said members to provide a second group of higher driving ratios, latch means associated with said member and operative to prevent the movement thereof to a position in the second group, and means responsive to the selection of one of the positions in the first group for shifting said latch means to provide for the selection of one of the positions in the first group.

5. In a selective transmission, an optionally shiftable member movable to a plurality of positions to provide different driving ratios, a shiftable latch plate restraining the movement of said member to a limited number of said positions, and means for shifting the latch plate upon the selection of either of two of said limited number of positions to permit the selection of other positions.

6. In a transmission, a shiftable member optionally movable to a plurality of positions, means serving to limit the movement of said member to movement into certain of said positions and to positively prevent the movement of said member toward other of said positions, and means responsive to the selection of at least one of said certain positions for shifting said movement preventing means to provide for the selection of a number of positions including said other positions and at least said one of said certain positions.

7. In a transmission, a shiftable member optionally movable to a plurality of positions separable into two end groups and at least one intermediate group, means operative in one position to limit the movements of said shiftable member to select positions in one of said end groups and said intermediate group, and means responsive to the selection of one of the positions in said intermediate group for shifting said limiting means to provide for the selection of positions in the other of said end groups.

8. In a selective transmission, an optionally shiftable member normally movable to a number of selected positions in a given sequence and separable into two end groups and one intermediate group, a shiftable plate engageable with said member and operative in one position to limit the movement of said member to positions in the intermediate group and in one of said end groups and operative in another position to limit the movement of said member to positions in the intermediate group and in the other of said end groups, and means serving to check the movement of said shiftable plate from one position to another so as to prevent the accidental selection of one of said end group positions out of the proper sequence.

9. In a selective transmission, an optionally shiftable member normally movable to a number of selected positions in a given sequence, means operative at any one time to restrict the number of positions to which said shiftable member may be moved, and means for shifting said first means relative to the total number of selected positions possible.

10. In a selective transmission, an optionally shiftable member normally movable to a number of selected positions in a given sequence, a latch member embracing said shiftable member and limiting its movements to a selection of certain of said positions, and latch mechanism providing for the movement of said latch member to a new position in which said shiftable member is limited to a selection to certain positions different from those capable of being selected in the first position of said latch member.

11. In a selective transmission, an optionally shiftable member movable to a number of selected positions, releasable means effective to prevent the movement of said member to certain of said positions, and means operated by the movement of said member to other of said selected positions for releasing said first means to permit the movement of said member to at least one of said certain positions.

12. In a selective transmission, an optionally shiftable member movable to a number of selected positions, releasable means effective to prevent the movement of said member to certain of said positions, said means comprising a latch plate embracing said shiftable member, means operated by the movement of said member to other of said selected positions for releasing said latch plate to prevent the movement of said member to at least one of said certain positions, and biased means for imposing a resistance on the latch plate tending to prevent its return.

13. In a transmission, a shiftable member optionally movable to a plurality of selected positions, a shiftable spring pressed latch plate restricting the movements of said member to a limited number of said positions, stop means restraining the latch plate from movement, and means operative upon engagement by said member upon being shifted to certain of said limited positions for freeing said latch plate from said stop means to permit movement thereof to present other positions of said shiftable member for selection.

14. In a transmission, a shiftable member optionally movable to a plurality of selected positions, a shiftable spring pressed latch plate restricting the movements of said member to a limited number of said positions, stop means restraining the latch plate from movement, and cam means disposed in the path of movement of the shiftable member toward certain of said limited positions and operative upon engagement by said member for freeing said latch plate from said stop means to permit movement thereof to present other positions of said shiftable member for selection.

15. In a transmission, a shiftable member optionally movable to a plurality of selected positions, a shiftable latch plate biased for movement in one direction and serving to limit the movements of said shiftable member to a limited number of said positions, stop means opposing said bias and operative to restrain said latch plate from movement thereunder, and a pivoted lever having one portion connected with said plate and another portion disposed in the path of movement of said shiftable member and operative upon being engaged thereby for shifting said latch plate to free the same from said stop means, said latch plate thereupon moving under the influence of said bias to a new position to permit the selection of other positions for said shiftable member.

16. In a transmission, a shiftable member optionally movable to a plurality of selected positions, a shiftable latch plate biased for movement in one direction and having a slot in which said member is disposed and an abutment shoulder, the edges of said slot serving to limit the movements of said shiftable member to a limited number of said positions, stop means cooperating with said abutment shoulder on plate for opposing said bias and operative to restrain said latch plate from movement thereunder, one end of said slot having an abutment portion, and a pivoted lever having one portion connected with said plate and another portion disposed adjacent the other end of said slot, said latch plate being freed from said stop means by the engagement of either the pivoted lever or said cam portion by said shiftable member.

17. In a transmission, a casing, a shiftable member optionally movable to a plurality of selected positions, a latch plate carried by said casing for pivotal and sliding movement relative thereto and cooperating with said shiftable member for limiting the movements of the latter, stop means holding said latch plate in one position, means biasing said plate for sliding movement to another position, and means operative by a movement of said shiftable member to certain of said positions for swinging said latch plate away from said stop means to permit said biasing means to slide the plate toward said other position.

18. In a transmission, a casing, a shiftable member optionally movable to a plurality of selected positions, a latch plate carried by said casing for pivotal and sliding movement relative thereto and cooperating with said shiftable member for limiting the movements of the latter to movements toward a certain group of said positions, means biasing said plate for sliding movement to one position, stop means carried by said casing and arranged to restrain said latch plate from movement to said one position, and means operative by a movement of said shiftable member to certain of the positions within said group for swinging said latch plate away from said stop means to permit said biasing means to slide the plate to permit said shiftable member to be moved to positions outside said group.

ROBERT LAPSLEY.

CERTIFICATE OF CORRECTION.

Patent No. 2,027,442.  January 14, 1936.

ROBERT LAPSLEY.

It is hereby certified that error appears in the printed specification of the above numbered patent requiring correction as follows: Page 4, second column, line 43, claim 4, for "first" read second; and that the said Letters Patent should be read with this correction therein that the same may conform to the record of the case in the Patent Office.

Signed and sealed this 25th day of February, A. D. 1936.

(Seal)

Leslie Frazer
Acting Commissioner of Patents.